(12) United States Patent
Sumi et al.

(10) Patent No.: US 11,686,842 B2
(45) Date of Patent: Jun. 27, 2023

(54) SONAR UNIT

(71) Applicants: AISIN CORPORATION, Kariya (JP); WHETRON ELECTRONICS (SUZHOU) CO., LTD, Suzhou (CN)

(72) Inventors: Chiaki Sumi, Kariya (JP); Takaaki Nakamura, Kariya (JP); Toshihito Nagai, Kariya (JP); Gaoyang Hong, Suzhou (CN)

(73) Assignees: AISIN CORPORATION, Aichi (JP); WHETRON ELECTRONICS (SUZHOU) CO., LTD., Suzhou (CN)

( * ) Notice: Subject to any disclaimer, the term of this patent is extended or adjusted under 35 U.S.C. 154(b) by 79 days.

(21) Appl. No.: 16/901,740

(22) Filed: Jun. 15, 2020

(65) Prior Publication Data

US 2020/0393564 A1 Dec. 17, 2020

(30) Foreign Application Priority Data

Jun. 17, 2019 (JP) .................................. 2019-111970

(51) Int. Cl.
*G01S 15/08* (2006.01)
*G01S 7/521* (2006.01)
(Continued)

(52) U.S. Cl.
CPC .............. *G01S 15/08* (2013.01); *G01S 7/521* (2013.01); *G01S 15/931* (2013.01); *B60R 16/0231* (2013.01)

(58) Field of Classification Search
CPC ........ G01S 7/521; G01S 15/08; G01S 15/931; B60R 16/0231
See application file for complete search history.

(56) References Cited

U.S. PATENT DOCUMENTS 6,166,995 A * 12/2000 Hoenes ................... G01S 15/42
367/99
8,306,252 B2 * 11/2012 Dinh ....................... H04R 3/00
381/357

(Continued)

FOREIGN PATENT DOCUMENTS

| JP | 2005159144 A | 6/2005 | |
| JP | 2014075825 A | 4/2014 | |
| WO | WO-2013051524 A1 * | 4/2013 | ........... B06B 1/0681 |

OTHER PUBLICATIONS

English Translation of a description of a metallic shield board of a sonar manufactured by Valeo (French manufacturer)—1 page.

(Continued)

*Primary Examiner* — Daniel L Murphy
*Assistant Examiner* — Amie M Ndure
(74) *Attorney, Agent, or Firm* — Buchanan Ingersoll & Rooney PC

(57) ABSTRACT

A sonar unit includes: a circuit substrate on which a transducer, electronic components constituting a circuit configured to drive the transducer, and an input-output terminal for the circuit are mounted; and a shield unit. The shield unit includes a plate portion at a position where the plate portion overlaps at least a part of the electronic components when the shield unit is viewed in a thickness direction of the rectangular circuit substrate. The shield unit includes a window portion provided as a through-hole or a notch. The window portion is placed at a position close to the input-output terminal in a longitudinal direction of the rectangular circuit substrate when the window portion is viewed in the thickness direction of the rectangular circuit substrate.

5 Claims, 6 Drawing Sheets

(51) Int. Cl.
*G01S 15/931* (2020.01)
*B60R 16/023* (2006.01)

(56) References Cited

U.S. PATENT DOCUMENTS

| | | | | |
|---|---|---|---|---|
| 8,604,937 | B2* | 12/2013 | Owens | B60R 16/03 |
| | | | | 340/636.15 |
| 8,649,506 | B2* | 2/2014 | Dinh | H04R 1/02 |
| | | | | 379/433.02 |
| 2005/0264472 | A1* | 12/2005 | Rast | G09G 3/14 |
| | | | | 345/30 |
| 2007/0047753 | A1* | 3/2007 | Watson | B60R 11/0247 |
| | | | | 381/365 |
| 2011/0025850 | A1* | 2/2011 | Maekawa | H05K 9/002 |
| | | | | 348/148 |
| 2013/0229522 | A1* | 9/2013 | Schofield | B60K 35/00 |
| | | | | 348/148 |
| 2016/0286162 | A1 | 9/2016 | Maekawa et al. | |
| 2017/0080255 | A1* | 3/2017 | Law | B06B 1/0622 |
| 2018/0048857 | A1 | 2/2018 | Maekawa et al. | |
| 2019/0150881 | A1* | 5/2019 | Maharbiz | A61B 8/0875 |
| 2019/0266374 | A1* | 8/2019 | Lee | G06F 1/169 |

OTHER PUBLICATIONS

English Translation of a Note published by Nissan Motor Co., Ltd. describing a metallic shield board of a sonar manufactured by Valeo (French manufacturer), 1 page, publication date not known, but prior to Jun. 17, 2019.

* cited by examiner

SONAR UNIT

CROSS-REFERENCE TO RELATED APPLICATION

This application claims priority to Japanese Patent Application No. 2019-111970 filed on Jun. 17, 2019, incorporated herein by reference in its entirety.

BACKGROUND

1. Technical Field

The present disclosure relates to a sonar unit.

2. Description of Related Art

In a circuit substrate for a sensor unit or the like that is requested to perform an electrical process on a weak analogue signal, an influence of static electricity or an electromagnetic wave that mixes from outside is relatively large. In such a case, a shield unit configured to protect the circuit substrate from the electromagnetic wave or the like is used.

Japanese Unexamined Patent Application Publication No. 2005-159144 (JP 2005-159144 A) describes a shield case (corresponding to a shield unit in the present application) in which easiness in attachment to a circuit substrate provided in an electronic device and a reworking property are improved. JP 2005-159144 A points out the following problem. That is, in a case where a shield case itself is fixed onto a circuit substrate by soldering, when repair to replace a circuit component inside the shield case is performed, for example, an operation to remove the shield case fixed by soldering is required. Thus, the reworking property is low. In order to solve such a problem, the shield case in JP 2005-159144 A is constituted by a side plate portion and a top plate portion. The side plate portion has a frame shape having a side portion fixed onto a circuit substrate and has a shape having a flat portion extending generally horizontally from an upper end of the side portion, the flat portion having a predetermined area. The top plate portion has a shape fitted to the side plate portion to cover the side plate portion and the circuit substrate. Hereby, rework is performable by removing the fitted top plate portion at the time of performing rework such as replacement of a circuit component inside the shield case.

Japanese Unexamined Patent Application Publication No. 2014-075825 (JP 2014-075825 A) describes a camera unit including a circuit substrate, an image sensor attached to the circuit substrate, a shield plate (corresponding to the shield unit in the present application) covering the circuit substrate and connected to ground (earth), a camera housing in which the circuit substrate and the shield plate are accommodated, and so on. The camera unit is connected to a cable. JP 2014-075825 A describes that, in this camera unit, static electricity on the shield plate can be introduced to the earth without passing through the circuit substrate, and further, since the circuit substrate is covered with the shield plate having a ground potential, an effect of electromagnetic wave measures can be yielded.

SUMMARY

In the unit described in JP 2005-159144 A, the circuit substrate can be protected from electromagnetic waves and static electricity by covering the circuit substrate with the shield unit, but it is also assumed that there are some restrictions on an assembling order of the circuit substrate, electronic components to be mounted on the circuit substrate, the shield unit, and a housing in which the circuit substrate and so on are accommodated. The unit described in JP 2014-075825 A can provide a predetermined effect for measures for static electricity and electromagnetic waves but does not mention anything about whether or not there are restrictions (hereinafter referred to as "restrictions on assembling") on the assembling order of the circuit substrate and the housing. On this account, a proposal of a structure including a shield unit or the like that balances noise measures such as blocking of statistic electricity or electromagnetic waves with relaxation of restrictions on assembling is requested. Particularly, a proposal on a sensor required to be downsized and improved in accuracy (low noise) is requested. The sensor is, for example, a sonar unit used as an in-vehicle distance sensor for collision prevention.

The present disclosure provides a sonar unit that balances noise measures with relaxation of restrictions on assembling.

A sonar unit according to an aspect of the present disclosure includes a transducer, a rectangular circuit substrate, and a shield unit. The transducer is configured to receive an ultrasonic wave. On the circuit substrate, the transducer, electronic components constituting a circuit configured to drive the transducer, and an input-output terminal for the circuit are mounted. The shield unit is placed in the circuit substrate, and the shield unit is configured to block an electromagnetic wave incident on the electronic components. The input-output terminal is placed on a first end side of the circuit substrate in a longitudinal direction of the circuit substrate. The shield unit includes a plate portion at a position where the plate portion overlaps at least a part of the electronic components when the shield unit is viewed in a thickness direction of the circuit substrate. The shield unit includes a window portion provided as a through-hole or a notch penetrating through the plate portion in a thickness direction of the plate portion. The window portion is placed at a position close to the input-output terminal in the longitudinal direction of the circuit substrate when the window portion is viewed in the thickness direction of the circuit substrate.

In the above aspect, the transducer is provided on a first surface (hereinafter referred to as a front surface) of the circuit substrate. The shield unit is placed on the front surface or its opposite surface (hereinafter referred to as a back surface). The plate portion of the shield unit overlaps the electronic components on the circuit substrate when the plate portion is viewed in the thickness direction of the circuit substrate, so that the plate portion protects the electronic components from noise (e.g., an electromagnetic wave) from outside (e.g., the plate portion blocks the noise).

In the above aspect, in a case where the shield unit is placed on the back surface, a part, of the back surface of the circuit substrate, that overlaps the window portion of the shield unit when the circuit substrate is viewed in the thickness direction of the circuit substrate is exposed to outside through the window portion. Hereby, an operator or an operation terminal or the like such as industrial equipment can approach the back surface in that part through the window portion. For example, it is possible to perform soldering of a lead terminal of the transducer or the like by operation from the back surface. In a case where the shield unit is placed on the front surface, the back surface of the circuit substrate is exposed to outside, so that the operator or the like can approach the back surface. Further, the lead terminal of the transducer or the like is connectable to the circuit substrate through the window portion. Hereby, the transducer, the circuit substrate, and the shield unit can be assembled regardless of order, so that restrictions on the assembling can be relaxed.

In the above aspect, spaces on the opposite surfaces of the shield unit communicate with each other via the window portion. For example, in a case where resin sealing is performed by filling a sealing material such as resin or resin precursor into an internal space of a housing, when the sealing material is supplied from a first surface side of the shield unit, the sealing material flows through the window portion, so that the sealing material is also filled into a second surface side. Further, since air bubbles caused at the time of sealing can pass through the window portion together with the flow of the sealing material, it is possible to easily remove the air bubbles between the circuit substrate and the shield unit.

Note that, in the above aspect, a part where the window portion is provided is not protected from noise, but electronic components mounted at a position relatively distanced from the input-output terminal are protected by the plate portion. That is, since the window portion is placed at a position close to the input-output terminal for which the need of protection from noise is relatively smaller than the need of protection for the electronic components from noise, protection for the circuit substrate from noise is balanced with relaxation of restrictions on assembling.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

A sonar unit according to an embodiment of the present disclosure will be described with reference to the drawings.

Schematic Configuration

Figure 1:
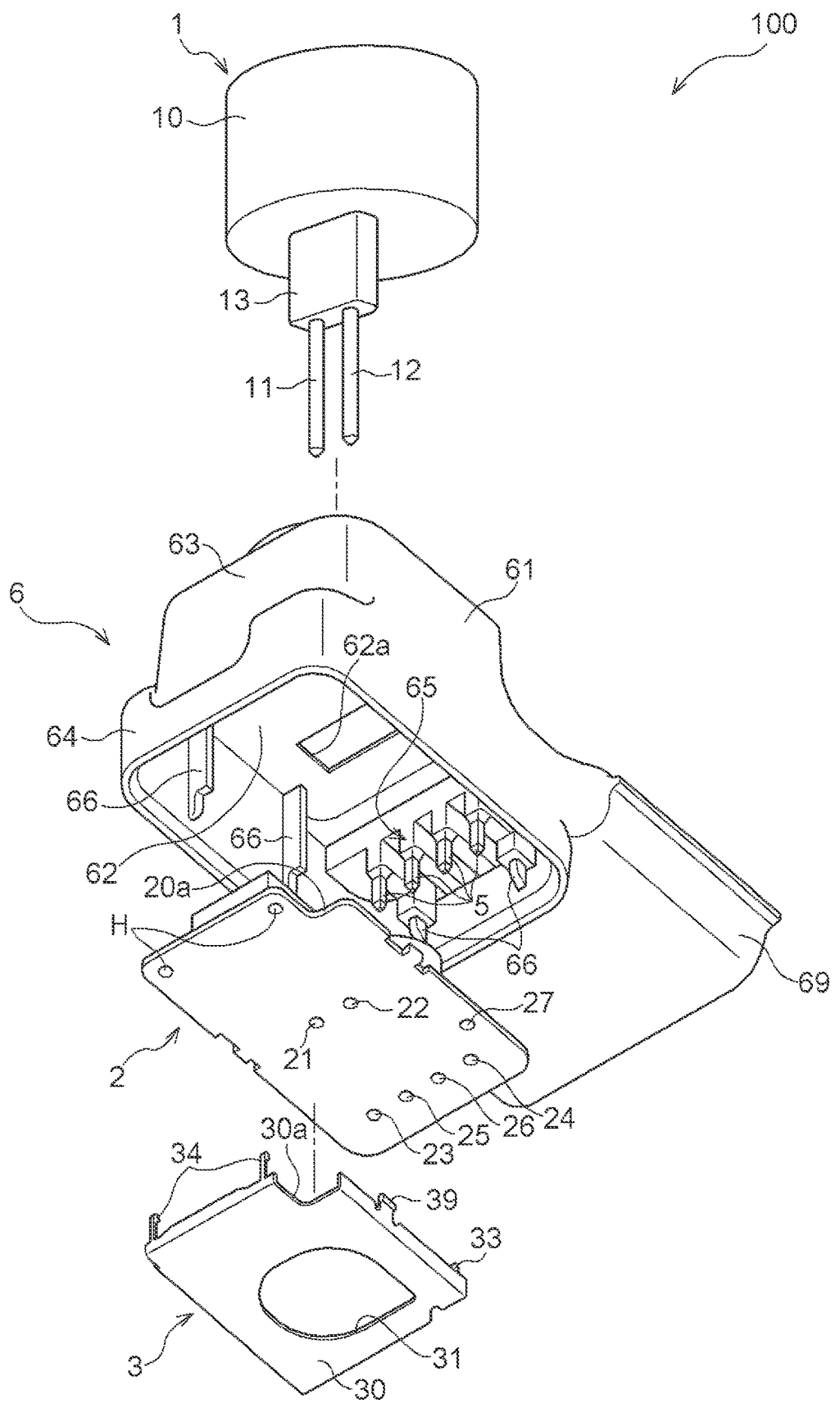
FIG. 1 is an exploded perspective view of a sonar unit.

FIG. 1 illustrates an exploded perspective view of a sonar unit (hereinafter referred to as a sonar 100) used as an in-vehicle distance sensor for collision prevention or the like, for example.

The sonar 100 includes a circuit substrate (hereinafter referred to as a substrate 2) on which a transducer 1 including a piezoelectric element (not shown) or the like configured to transmit and receive ultrasonic waves is provided, a shield unit (hereinafter referred to as a shield 3) including a plate portion 30 covering the substrate 2, an input-output pin 5 electrically connected to the substrate 2 and serving as an interface for input and output of the sonar 100, and a housing 6 in which these members are accommodated. The input-output pin 5 includes four terminal pins, for example. The four terminal pins include two power pins and two signal pins. Note that the two power pins indicate a so-called +V input pin to which a voltage is applied and a GND pin connected to ground.

The sonar 100 communicates with a travel control device (not shown, hereinafter referred to as an ECU) for a vehicle via the input-output pin 5 and also receives power supply via the input-output pin 5. The travel control device is an external device. Further, the sonar 100 communicates with other sonars 100 as external devices via the input-output pin 5, and the sonar 100 also receives power supply and performs power supply via the input-output pin 5.

Figure 2:
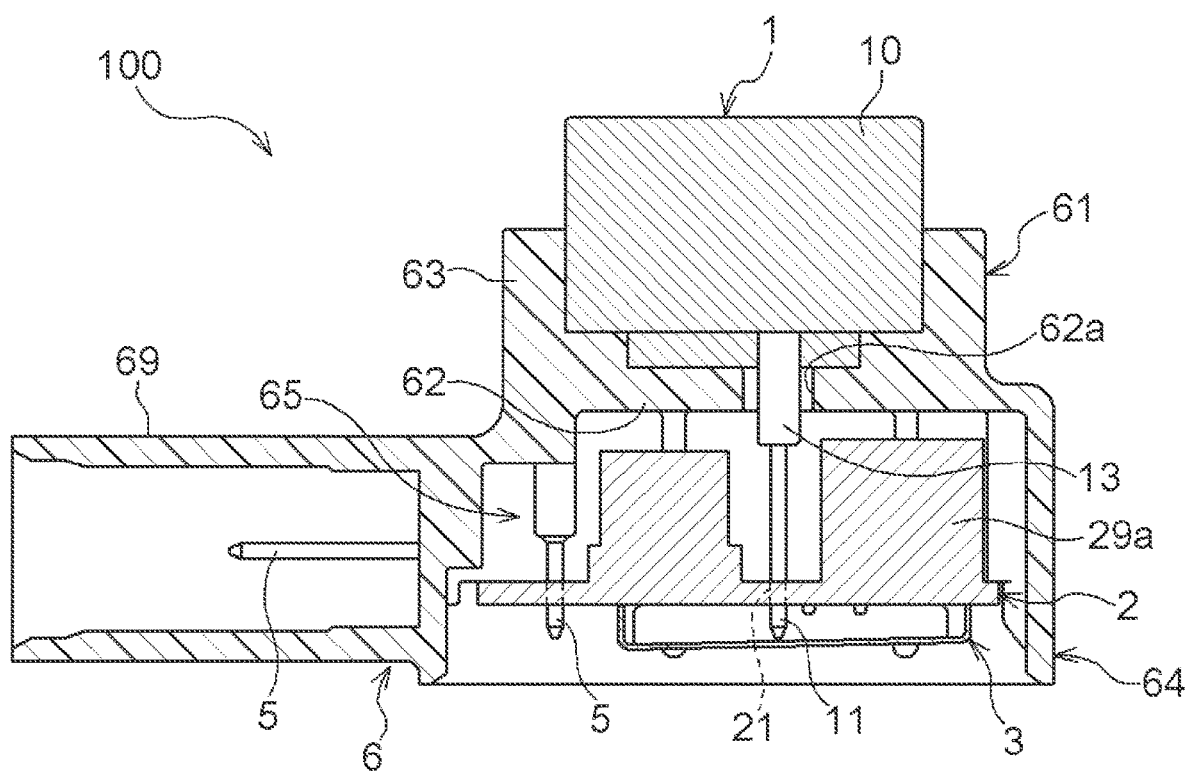
FIG. 2 is a longitudinal sectional view of the sonar unit before a sealing material is injected.

As illustrated in FIGS. 1, 2, the sonar 100 is configured such that the transducer 1, the substrate 2, and the shield 3 are accommodated in the housing 6 in a state where they are superimposed in this order when they are viewed in a thickness direction of the substrate 2. In the following description, a side where the transducer 1 is provided is defined as an upper side when the sonar 100 is viewed from the substrate 2, and a side opposite to this is defined as a lower side. Further, a direction parallel to the thickness direction of the substrate 2 is referred to as an up-down direction. That is, the transducer 1 is placed above the substrate 2 inside the housing 6. Further, the shield 3 is placed on the lower side inside the housing 6.

The sonar 100 executes a so-called time-of-flight (TOF) method in which the transducer 1 transmits an ultrasonic wave and receives a reflected wave obtained when the ultrasonic wave is reflected by an object (not shown), so that the sonar 100 finds a distance between the transducer 1 and the object based on a time and a sonic velocity from the transmission to the reception.

Description of Each Part

The transducer 1 is a device configured such that a piezoelectric element configured to transmit and receive ultrasonic waves, wiring lines, and so on (not shown) are accommodated inside a tubular body made of metal or the like. As illustrated in FIG. 1, the transducer 1 includes a body portion 10 including the piezoelectric element and having a wave transmission-reception surface for ultrasonic waves, a base portion 13 extending downward from the body portion 10, and terminals 11, 12 as lead terminals electrically connected to the piezoelectric element and a wiring pattern of the substrate 2 and to be fixed to the substrate 2. The terminals 11, 12 are wire-shaped electrodes made of metal or metal alloy and extend downward from the base portion 13.

Figure 3:
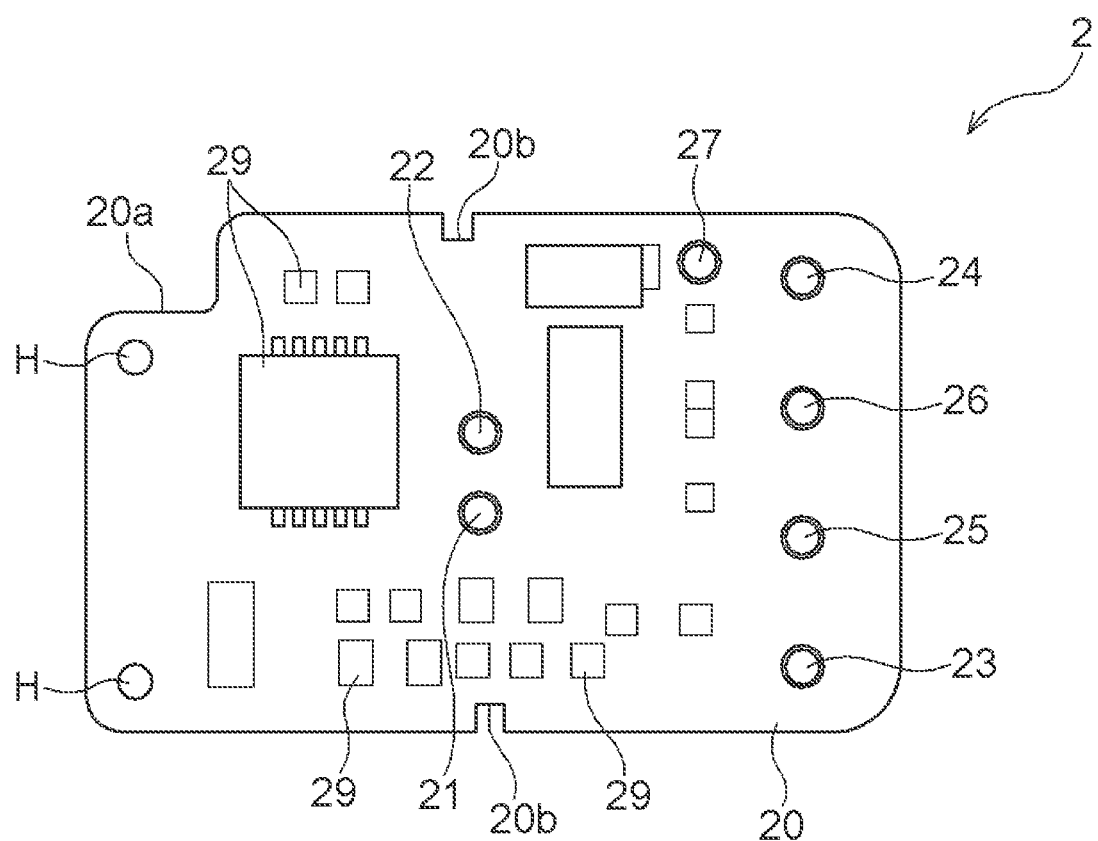
FIG. 3 is a view of a substrate viewed from a back-surface side.

As illustrated in FIG. 3, the substrate 2 is a printed circuit board including a plate-shaped main body 20 on which a circuit is formed by the wiring pattern (not shown) and electronic components 29.

The main body 20 has a rectangular shape, and one of four corners is a recessed portion 20a having a shape cut to be recessed inwardly in the rectangular shape. The transducer 1 and the electronic components 29 constituting a wave transmission-reception circuit and so on for the transducer 1 are mounted on a surface of the main body 20. The transducer 1 and a large-sized electronic component 29a (see FIG. 2) such as an electrolytic capacitor that is relatively tall among the electronic components 29 are mounted on a front-surface side (the upper side) of the main body 20. The shield 3 (see FIG. 2) is placed on a back-surface side (the lower side) of the main body 20. Further, through-holes 21 to 27 electrically connected to the wiring pattern are formed in the main body 20. Further, through-holes H, H and notches 20b, 20b are formed in the main body 20. In the following description, a direction parallel to a longitudinal direction of the main body 20 may be just referred to as a longitudinal direction. Also, a direction parallel to a short direction of the main body 20 may be just referred to as a short direction.

The recessed portion 20a has a shape recessed in a rectangular shape toward an inner side of the main body 20. One of vertices of a triangular shape of the recessed portion 20a is placed inside the main body 20. The other two vertices of the recessed portion 20a overlap with two adjacent sides of the main body 20.

The through-holes 23 to 26 are input-output terminals (contact points) of the circuit of the substrate 2 and to which the input-output pin 5 (see FIG. 1) is electrically connected. The through-holes 23, 24 are power-input terminals. The through-hole 23 is connected to the +V input pin of the input-output pin 5, and the through-hole 24 is connected to the GND pin of the input-output pin 5. The through-holes 23 to 26 are formed in an end portion of the main body 20 in the longitudinal direction, the end portion being on a side opposite to a side where the recessed portion 20a is formed. The connection of the through-holes 23 to 26 to the input-output pin 5 will be described later together with the description about the housing 6.

The through-holes 21, 22 (an example of a second through-hole) are contact points for mounting the transducer 1. The terminals 11, 12 (see FIG. 1) are passed through the through-holes 21, 22, respectively, such that the terminal 11, 12 are joined to the through-holes 21, 22 by soldering or the like. The through-holes 21, 22 are formed in the main body 20 between the through-holes 23 to 26 and the recessed portion 20a in the longitudinal direction.

The through-hole 27 (an example of a first through-hole) is a contact point to which the shield 3 is electrically connected. The through-hole 27 is placed between the through-holes 21, 22 and the through-hole 24 in the longitudinal direction. The through-hole 27 and the through-hole 24 are placed such that a center-distance from the through-hole 27 to the through-hole 24 is short, and the center-distance is shorter than center-distances from the through-hole 27 to the through-holes 23, 25, 26. The through-hole 27 is electrically connected to the through-hole 24 by the wiring pattern and serves as ground for the shield 3. The electric connection between the through-hole 27 and the shield 3 will be described later together with the description about the shield 3.

The through-holes H, H are holes to which the shield 3 (see FIG. 1) is locked. The through-holes H, H are formed in an end portion of the main body 20 on the same side as the recessed portion 20a in the longitudinal direction. The through-holes H, H are formed in the main body 20 on a side close to the recessed portion 20a and on a side distanced from the recessed portion 20a in the short direction. The notches 20b, 20b are engageable portions to which the shield 3 is locked. The notches 20b, 20b are formed in opposite end portions of the main body 20 in the short direction. The locking of the shield 3 to the through-holes H, H and to the notches 20b, 20b will be described later together with the description about the shield 3.

The electronic components 29 include the wave transmission-reception circuit, that is, a circuit configured to amplify an electrical signal output from the transducer 1 (see FIG. 1), and a circuit configured to communicate with the ECU or the like. Since the circuit configured to amplify an electrical signal output from the transducer 1 handles a weak analog signal, it is preferable to sufficiently protect the circuit form electrical noise. It is preferable that, particularly a component, among the electronic components 29, that constitutes the circuit configured to amplify an electrical signal output from the transducer 1 be placed between the through-holes H, H (see FIG. 2) and the through-holes 21, 22 on the back-surface side of the main body 20. Further, it is preferable that the component be placed at a position (a position covered with the plate portion 30), in the main body 20, that overlaps the plate portion 30 (described later) (see FIGS. 1, 4) of the shield 3 when the main body 20 is viewed in the up-down direction, such that the component is not exposed through a through-hole 31 (described later) of the shield 3.

Figure 4:
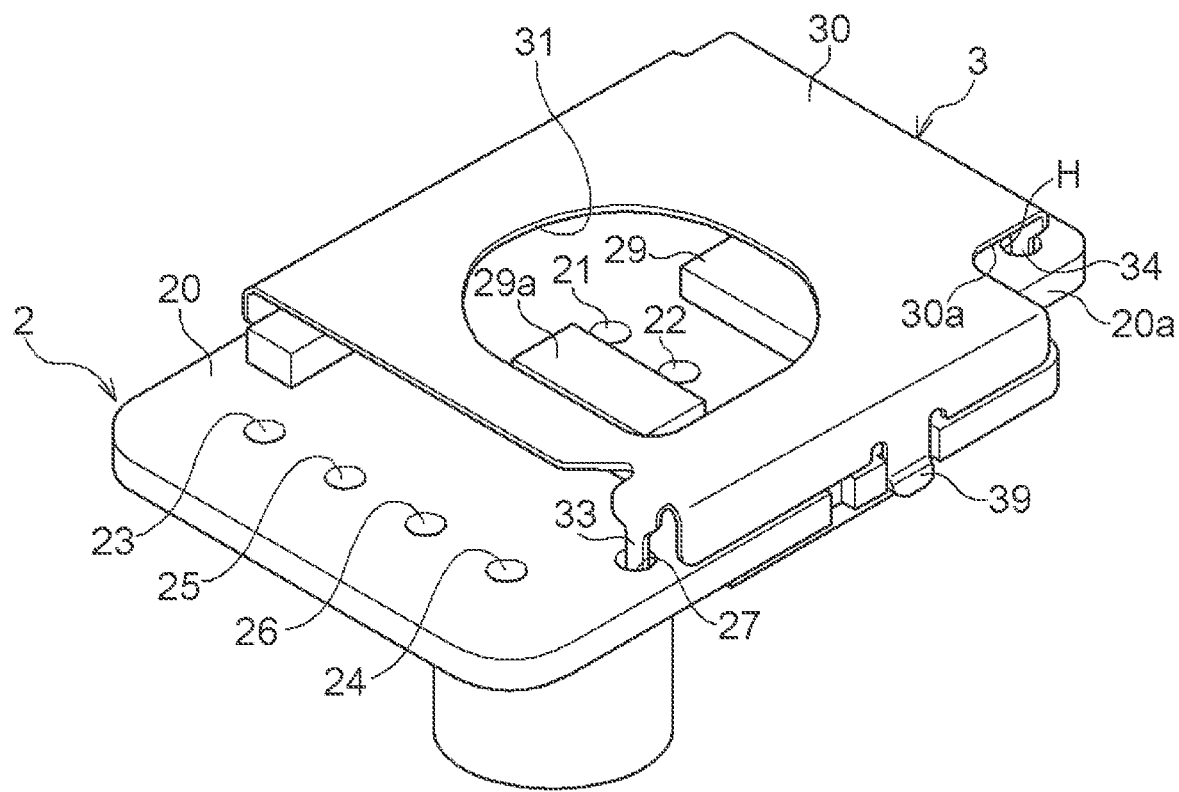
FIG. 4 is a perspective view of the substrate and a shield mounted on the substrate.

The shield 3 is an electrically-conductive component formed integrally by performing press working or the like on a metal plate, as illustrated in FIGS. 1, 4. The shield 3 protects (shields) the electronic components 29 from electrical noise that comes flying from outside. The shield 3 includes the plate portion 30 in which the through-hole 31 (an example of a window portion) having a round shape is formed, a GND terminal 33 (an example of an attachment terminal) and leg portions 34, 34 having a pin shape and extending upward along a vertical line of the plate portion 30 from an outer peripheral part of the plate portion 30, and snap fit portions 39 each extending upward along the vertical line of the plate portion 30 from the outer peripheral part of the plate portion 30 and having a distal end bending in a detent shape toward an inner side of the plate portion 30.

The plate portion 30 has a rectangular shape, and one of four corners is a recessed portion 30a having a shape cut to be recessed inwardly in the rectangular shape. The plate portion 30 is disposed so as to overlap the electronic components 29 on the substrate 2 in the up-down direction. Hereby, the plate portion 30 protects (shields) the electronic components 29 from electrical noise that comes flying from outside (particularly from below).

The recessed portion 30a has a shape recessed in a rectangular shape toward the inner side of the plate portion 30. One of vertices of a triangular shape of the recessed portion 30a is placed inside the plate portion 30. The other two vertices of the recessed portion 30a overlap with two adjacent sides of the plate portion 30.

The leg portions 34, 34 (see FIG. 1) are passed through (locked to) the through-holes H, H (see FIG. 2) so as to position the shield 3. The leg portions 34, 34 are formed in an end portion of the plate portion 30 on the same side as the recessed portion 30a in the longitudinal direction. The leg portions 34, 34 are formed in the plate portion 30 on a side close to the recessed portion 30a and on a side distanced from the recessed portion 30a in the short direction, respectively. The snap fit portions 39 engage with the notches 20b, 20b in the main body 20 of the substrate 2 so that the shield 3 is locked to the main body 20.

The GND terminal 33 is formed in an end portion of the plate portion 30 on a side opposite to the recessed portion 30a in the longitudinal direction and on the same side as the recessed portion 30a in the short direction of the plate portion 30. The GND terminal 33 is passed through the through-hole 27 such that the GND terminal 33 is joined to the through-hole 27 by soldering or the like. Hereby, the through-hole 27 is electrically connected to the shield 3, and the shield 3 is fixed to the main body 20. In a case where the GND terminal 33 is joined by soldering, its electric connection can be surely maintained against sealing by resin (described later), vibration and temperature change during usage, and other physical stimulations. Thus, durability improves.

Further, the shield 3 is connected to the GND pin of the input-output pin 5 via the through-hole 27 and the through-hole 24. That is, the shield 3, its GND terminal 33, the through-hole 27, the through-hole 24. and the GND pin of the input-output pin 5 are connected at the same potential (the same GND potential).

Since the through-hole 27 and the through-hole 24 electrically connected to the GND pin of the input-output pin 5 are placed such that the distance therebetween is short, the shield 3 and the GND pin (see FIG. 1) of the input-output pin 5 are electrically connected to each other so that an impedance is small.

As such, the shield 3 and the GND pin of the input-output pin 5 (see FIG. 1) are connected to each other at a low impedance, and therefore, an electric charge caused by an electromagnetic wave blocked by the shield 3 immediately flows out from the GND pin of the input-output pin 5. Further, even in a case where an electrical noise flows backward to the through-hole 24 from the GND pin of the input-output pin 5 by any chance, most of the electrical noise flowing backward to the through-hole 24 flows into the shield 3 and flows out from the GND pin of the input-output pin 5 right after that. Accordingly, even in either of a case where the shield 3 blocks an electrical noise such as an electromagnetic wave coming flying from an external space and a case where an electrical noise flows backward to the through-hole 24 from the GND pin of the input-output pin 5, it is possible to avoid large electrical noise from flowing into the substrate 2 and to protect the substrate 2 from the electrical noise.

The GND terminal 33 is formed to be longer than the leg portions 34, 34 (see FIG. 1) in the up-down direction, and therefore, in a state where the shield 3 is fixed to the main body 20, the shield 3 is inclined such that a gap between the main body 20 and the plate portion 30 is increased sequentially from a side where the leg portions 34, 34 are provided toward a side where the GND terminal 33 is provided. In a state where the shield 3 is fixed to the main body 20, the shield 3 does not overlap the through-holes 23 to 26 in the up-down direction. In a state where the shield 3 is fixed to the main body 20, the recessed portion 30a and the recessed portion 20a overlap each other when they are viewed in the up-down direction. In a state where the shield 3 is fixed to the main body 20 (the shield 3 is mounted on the substrate 2), the through-hole 31 and the through-holes 21, 22 overlap each other when they are viewed in the up-down direction (see FIGS. 4, 5).

The through-hole 31 is a hole penetrating through the plate portion 30 in the up-down direction. The through-hole 31 is formed at a position closer to the GND terminal 33 than the leg portions 34, 34 in the longitudinal direction.

As illustrated in FIGS. 1, 2, the housing 6 is a casing of the sonar 100 and made of resin or the like. The transducer 1, the substrate 2, the shield 3, and the input-output pin 5 are accommodated inside the housing 6. The housing 6 is formed by insert molding together with the input-output pin 5. The housing 6 includes a storage portion 61 that is a tubular member along the up-down direction, and a connector portion 69 that is a tubular member extending from a side portion of the tube of the storage portion 61.

As illustrated in FIG. 2, inside the tube of the connector portion 69, a main body of a terminal is arranged along an extending direction of the tube of the connector portion 69 in a state where first ends of the input-output pin 5 are exposed to an internal space of the connector portion 69. A connector of an external device is connected to the connector portion 69.

As illustrated in FIGS. 1, 2, the storage portion 61 is divided into a first storage portion 63 on the upper side and a second storage portion 64 on the lower side by a partition wall 62 intersecting with the up-down direction. An insertion hole 62a is formed in the partition wall 62 in a penetrating manner in the up-down direction.

As illustrated in FIG. 1, the first storage portion 63 is a rectangular tubular body, and four corners of the first storage portion 63 are chamfered in an R-shape, for example. The transducer 1 is accommodated in the first storage portion 63. The base portion 13 of the transducer 1 is passed through the insertion hole 62a in a state where the body portion 10 is put on a top face of the partition wall 62. Accordingly, the terminals 11, 12 of the transducer 1 are placed in the second storage portion 64.

The second storage portion 64 is a rectangular tubular body and has such a shape that four corners of the second storage portion 64 are chamfered in an R-shape, for example. Inside the tube of the second storage portion 64, a connecting portion 65 arranged in a state where second ends of the input-output pin 5 are exposed downward, and eight seats 66 (see FIG. 5) formed integrally with an inner wall of the tube and extending inwardly from the inner wall are provided. The substrate 2 with the bottom face to which the shield 3 is fixed is accommodated in the second storage portion 64.

The substrate 2 is accommodated inside the tube of the second storage portion 64 in a state where the top face of the substrate 2 makes contact with bottom faces of the seats 66. In this accommodation state, respective second ends of the input-output pin 5 are passed through the through-holes 23 to 26 of the substrate 2, so that electric connection is established. In the present embodiment, the through-holes 23 to 26 are joined to the input-output pin 5 by soldering.

Figure 5:
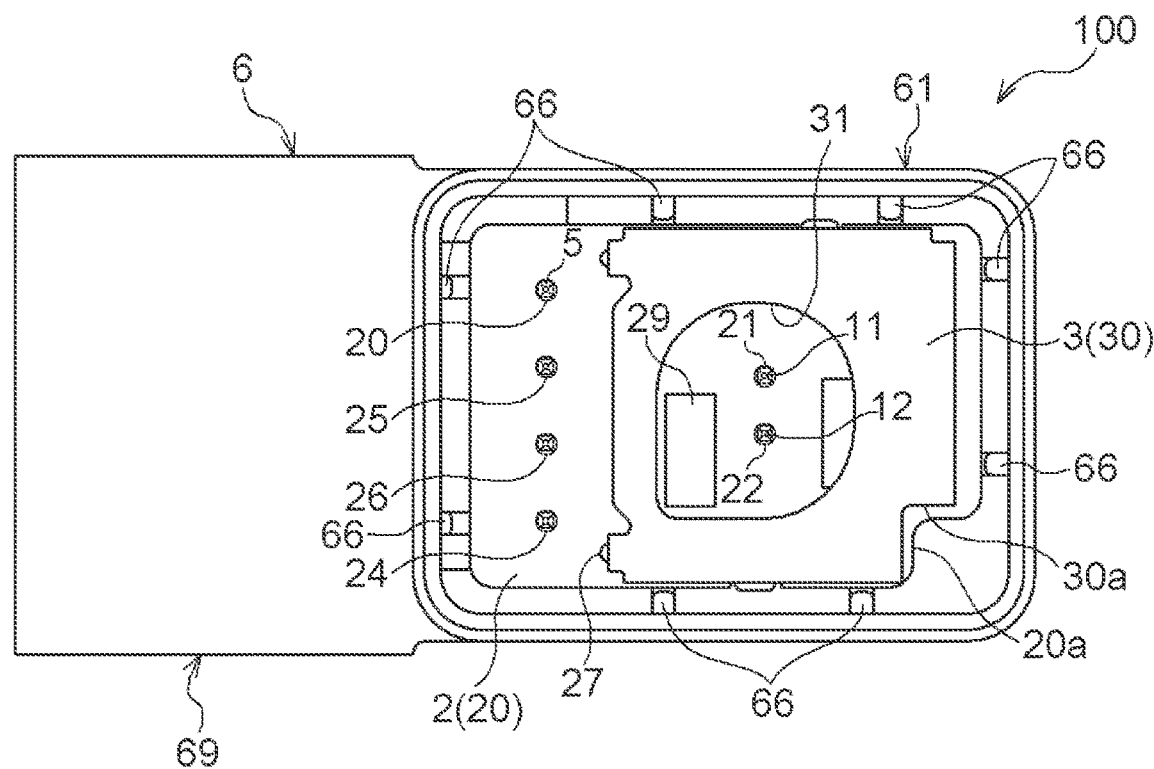
FIG. 5 is a view of the sonar unit viewed from the back-surface side of the substrate.

Further, the terminals 11, 12 of the transducer 1 are passed through the through-holes 21, 22 of the substrate 2, so that electric connection is established. In the present embodiment, the through-holes 21, 22 are joined to the terminals 11, 12 by soldering. As illustrated in FIGS. 1, 5, the through-hole 31 is formed in the shield 3 at a position overlapping the through-holes 21, 22 of the substrate 2 in the up-down direction. Accordingly, after the transducer 1 and the substrate 2 to which the shield 3 is fixed are accommodated in the housing 6, soldering between the through-holes 21, 22 and the terminals 11, 12 is performable through the through-hole 31 from the back-surface side of the substrate 2. On this account, the sonar 100 has a high degree of freedom of operation at the time of assembling (at the time of manufacture). More specifically, by inserting the tip of a soldering iron or a soldering device into the through-hole 31, soldering between the through-holes 21, 22 and the terminals 11, 12 is performable in a gap space between the shield 3 and the substrate 2.

In the internal space (a space inside the housing 6) of the second storage portion 64, a space between the substrate 2 and the partition wall 62 (a space facing the front-surface side of the substrate 2) communicates with a remaining space (a space facing the back-surface side of the substrate 2) via a passage formed between the recessed portion 30a of the shield 3 and an inner wall surface of the second storage portion 64 and a passage (an example of a communicating passage) formed between the recessed portion 20a of the substrate 2 and the inner wall surface of the second storage portion 64 (see FIG. 5).

Figure 6:
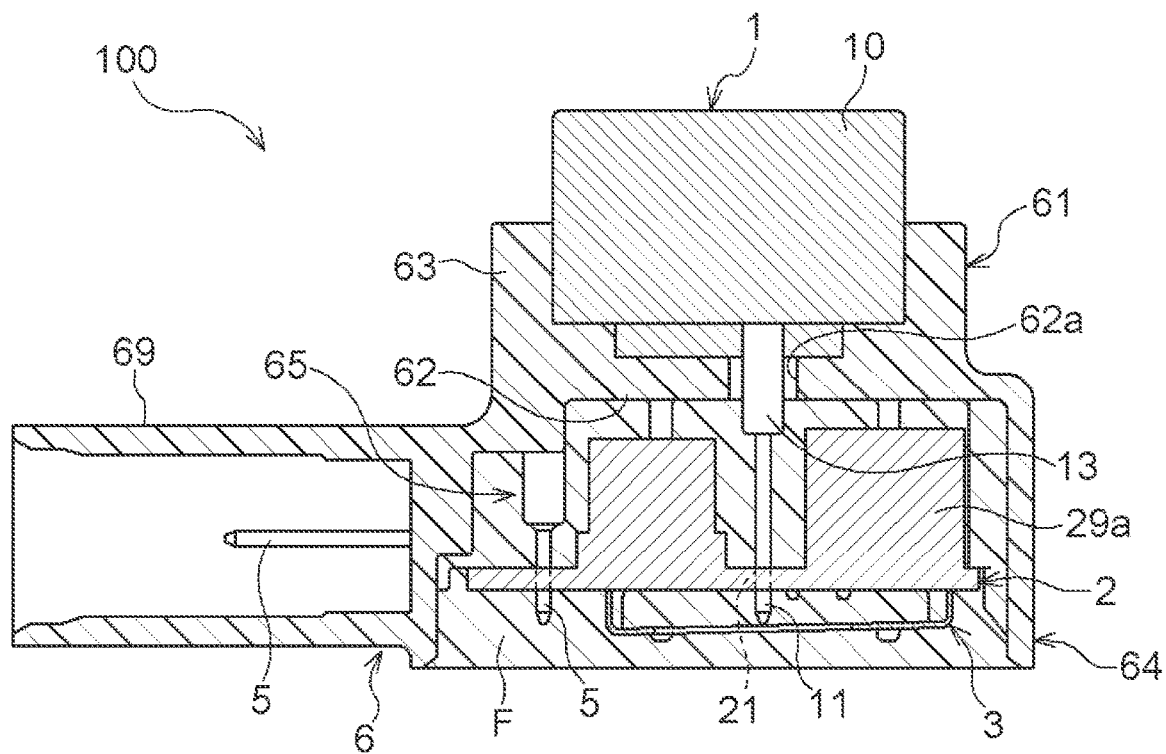
FIG. 6 is a longitudinal sectional view of the sonar unit after the sealing material is injected.

Resin F is filled in the whole internal space of the second storage portion 64, as illustrated in FIG. 6. This filling is performed, for example, such that, after a material (hereinafter referred to as a sealing material) such as fluid resin formed in a liquid form due to thermal melting or resin precursor to be hardened by radical polymerization or the like is filled in the internal space of the second storage portion 64, the sealing material is hardened to be the resin F. Due to the sealing of the internal space of the second storage portion 64, at least a lower part of the base portion 13, the terminals 11, 12, and the substrate 2 are all sealed.

The sealing material can be easily injected into the space between the substrate 2 and the partition wall 62 in the internal space of the second storage portion 64, through the recessed portion 30*a* of the shield 3 and the recessed portion 20*a* of the substrate 2.

The sealing material can be injected into the space between the substrate 2 and the shield 3 in the internal space of the second storage portion 64, through a gap between the substrate 2 and an end portion of the shield 3. At the time of injection of the sealing material, the sealing material should be injected from the vicinity of the recessed portion 30*a* and the recessed portion 20*a*. In such a configuration, the sealing material is injected into the space between the substrate 2 and the partition wall 62 through the recessed portion 30*a* of the shield 3 and the recessed portion 20*a* of the substrate 2, and the sealing material is injected into the gap between the substrate 2 and the shield 3 from the side where the leg portions 34, 34 are provided. Hereby, the sealing material can be efficiently injected into the whole internal space of the second storage portion 64. Particularly, the gap between the main body 20 and the plate portion 30 is increased sequentially from the side where the leg portions 34, 34 are provided toward the side where the GND terminal 33 is provided. Accordingly, when the sealing material is injected into the gap between the substrate 2 and the shield 3, air bubbles or the like are hard to remain between the main body 20 and the plate portion 30. Accordingly, a good workability is achieved, and therefore, this configuration is preferable. Further, since the through-hole 31 is formed in the shield 3, air of the air bubbles caused between the main body 20 and the plate portion 30 is also dischargeable from the through-hole 31, so that the air bubbles are hard to remain.

Thus, a sonar unit that balances noise measures with relaxation of restrictions on assembling can be provided.

Different Embodiments

The above embodiment describes a case where the main body 20 of the substrate 2 includes the recessed portion 20*a* at a corner part, the plate portion 30 of the shield 3 includes the recessed portion 30*a* at a corner part, and the space between the substrate 2 and the partition wall 62 in the internal space of the second storage portion 64 communicates with the remaining space (the space facing the back-surface side of the substrate 2) through the passage formed between the recessed portion 30*a* of the shield 3 and the inner wall surface of the second storage portion 64 and the passage formed between the recessed portion 20*a* of the substrate 2 and the inner wall surface of the second storage portion 64. Further, the above embodiment describes that, when the sealing material is injected into the space between the substrate 2 and the partition wall 62, the sealing material can be easily injected through the recessed portion 30*a* of the shield 3 and the recessed portion 20*a* of the substrate 2. However, passages through which the sealing material is injected into the space between the substrate 2 and the partition wall 62 can be formed such that respective gaps (recessed portions) are formed between an outer periphery of the main body 20 other than the corners and an inner periphery (the inner wall surface) of the second storage portion 64 and between the plate portion 30 other than the corners and the inner periphery of the second storage portion 64. Even in this case, it is preferable that the recessed portion formed in the shield 3 and the recessed portion formed in the substrate 2 overlap each other when they are viewed in the up-down direction.

The above embodiment describes a case where, in a state where the shield 3 is fixed to the main body 20, the recessed portion 30*a* and the recessed portion 20*a* overlap each other when they are viewed in the up-down direction. However, even in a positional relationship in which the recessed portion 30*a* and the recessed portion 20*a* do not overlap each other when they are viewed in the up-down direction, a passage through which the sealing material is injected into the space between the substrate 2 and the partition wall 62 is formed. Further, even in a case where the recessed portion 30*a* is not formed, a passage through which the sealing material is injected into the space between the substrate 2 and the partition wall 62 is formed. In a case where the recessed portion 30*a* is not formed, a passage through which the sealing material is injected into the space between the substrate 2 and the partition wall 62 may be formed by the through-hole 31 and the recessed portion 20*a*, for example.

The above embodiment describes a case where, in a state where the shield 3 is fixed to the main body 20, the shield 3 is inclined such that the gap between the main body 20 and the plate portion 30 is increased sequentially from the side where the leg portions 34, 34 are provided toward the side where the GND terminal 33 is provided. However, the main body 20 and the plate portion 30 can be placed in parallel to each other.

Figure 7:
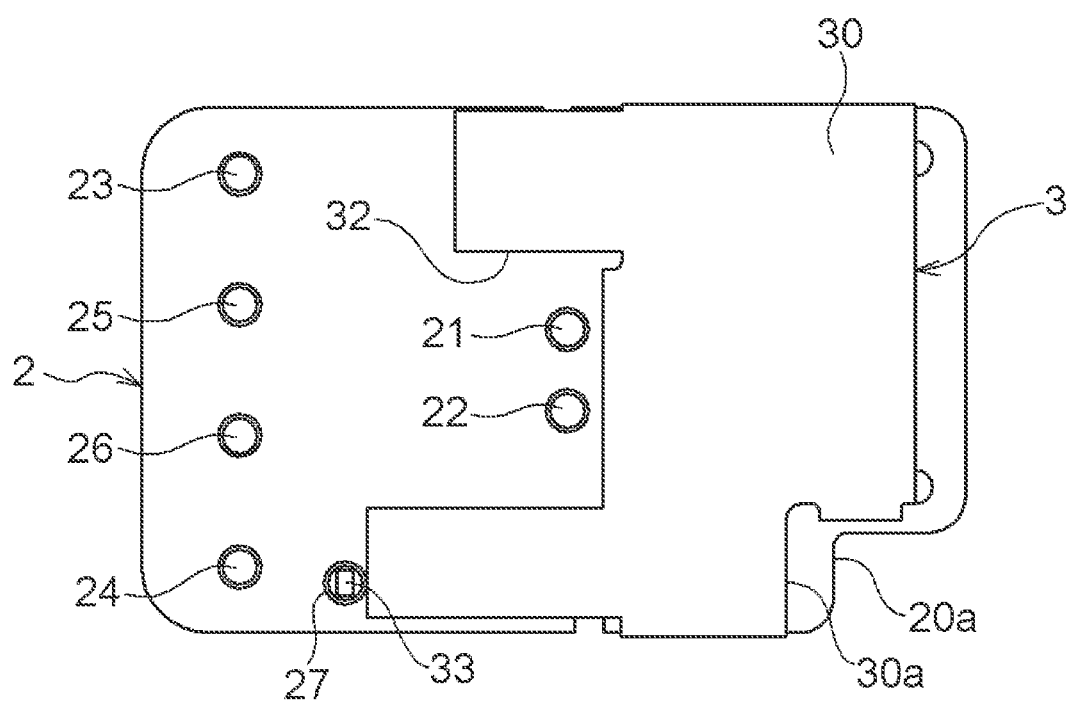
FIG. 7 is a view of the substrate and the shield mounted on the substrate and having another form, when the substrate and the shield are viewed from the back-surface side of the substrate.

The above embodiment describes a case where the shield 3 is configured such that the through-hole 31 having a round shape is formed in the plate portion 30 as an example of the window portion. However, the example of the window portion is not limited to the through-hole 31 having a round shape. For example, the through-hole 31 may have a rectangular shape or other polygonal shapes such as a triangular shape. Further, instead of the through-hole 31, a notch 32 formed by cutting the plate portion 30 from an end portion on the side where the GND terminal 33 is provided to its opposite side in the longitudinal direction may be provided as illustrated in FIG. 7, and in a state where the shield 3 is mounted on the substrate 2, the notch 32 and the through-holes 21, 22 may overlap each other when they are viewed in the up-down direction.

The above embodiment describes a case where the shield 3 is placed on the back-surface side of the main body 20, but the arrangement of the shield 3 is not limited to this. The shield 3 may be placed on the front-surface side of the main body 20. In this case, the terminals 11, 12 of the transducer 1 can be connected by being passed through the through-holes 21, 22 of the substrate 2 via the through-hole 31 of the shield 3. After the transducer 1 and the substrate 2 to which the shield 3 is fixed are accommodated in the housing 6, soldering between the through-holes 21, 22 and the terminals 11, 12 is performable from the back-surface side of the substrate 2.

Note that the configuration disclosed in the embodiment (including the different embodiments, the same shall apply hereinafter) can be applied in combination with configurations disclosed in other embodiments as long as there is no inconsistency. Further, the embodiment disclosed in the present specification is just an example. The embodiment of the present disclosure is not limited to this, and various modifications can be made within a range that does not deviate from the object of the present disclosure.

The present disclosure is applicable to a sonar unit.

In the above embodiment, the input-output terminal may include a GND terminal connected to ground. The circuit substrate may be electrically connected to the GND terminal and include a first through-hole having the same potential as the GND terminal. The shield unit may include an attachment terminal to be attached to the circuit substrate and may be electrically connected to the first through-hole and joined to the first through-hole in a state where the attachment terminal is passed through the first through-hole. The first through-hole may be disposed at a position where a distance to the GND terminal is shortest among terminals included in the input-output terminal.

In the above configuration, when the attachment terminal of the shield unit is joined to the first through-hole in a state where the attachment terminal is passed through the first through-hole, stability or certainty in maintaining a fixed state to the circuit substrate and in maintaining an electric connection state can be improved.

In addition, in the above configuration, when the first through-hole is disposed at a position where the distance to the GND terminal is shortest among the terminals included in the input-output terminal, it is possible to decrease an impedance between the shield unit and the ground as small as possible. Hereby, an electric charge of an electromagnetic wave blocked by the shield unit, e.g., an electric charge flowing backward from the ground, can be immediately released to the ground (grounded). Further, it is possible to reduce an influence of the electric charge on the circuit substrate.

In the above embodiment, the sonar unit may further include a housing in which the transducer and the shield unit are accommodated in a state where the transducer and the shield unit are mounted on the circuit substrate. The circuit substrate may have a communicating passage through which a space on a first surface side of the circuit substrate communicates with a space on a second surface side of the circuit substrate.

In the above configuration, the communicating passage formed in the circuit substrate penetrates from the back-surface side of the circuit substrate to the front-surface side of the circuit substrate, so that a space on the back-surface side of the circuit substrate communicates with a space on the front-surface side of the circuit substrate in an internal space of the housing. For example, in a case where resin sealing is performed by filling the sealing material such as resin or resin precursor into the internal space of the housing through the communicating passage, when the sealing material is supplied from either one of the front-surface side and the back-surface side of the circuit substrate, the sealing material is also filled into the other one of the front-surface side and the back-surface side, so that the whole internal space of the housing can be sealed.

In the above embodiment, a distance between the plate portion and the circuit substrate may become shorter from the first end side toward a second end side of the circuit substrate in the longitudinal direction.

In the above configuration, the plate portion of the shield unit is inclined such that the first end side is distanced from the circuit substrate more than the second end side. In other words, the shield unit is in an inclined state in which a gap between the circuit substrate and the plate portion is increased sequentially from the second end side toward the first end side. In this inclined state, when the sealing material is supplied from the second end side of the circuit substrate and the shield unit (a side where the gap between the circuit substrate and the plate portion is narrow) at the time when the sealing material is supplied into the internal space of the housing, air bubbles are hard to remain between the circuit substrate and the shield unit after sealing, so that an excellent sealing state is achieved.

In the above embodiment, the circuit substrate may include second through-holes through which lead terminals of the transducer are passed in an electrically connected manner. The transducer and the second through-holes may overlap the window portion when the transducer and the second through-holes are viewed in the thickness direction of the circuit substrate.

In the above configuration, in a case where the shield unit is placed on the back surface, when the lead terminal of the transducer is joined to the circuit substrate by soldering or the like, a joining operation such as soldering through the window portion is performable on the back surface of the circuit substrate in a state where the lead terminal is passed through the second through-hole from the front surface of the circuit substrate. In a case where the shield unit is placed on the front surface, a joining operation such as soldering is performable on the back surface of the circuit substrate in a state where the lead terminal is passed through the second through-hole from the front surface of the circuit substrate through the window portion of the shield unit.

What is claimed is:

1. A sonar unit comprising:
   a transducer configured to receive an ultrasonic wave;
   a rectangular circuit substrate on which the transducer, electronic components constituting a circuit configured to drive the transducer, and an input-output terminal for the circuit are mounted, the transducer comprising a body housing a piezoelectric element on a first side of the rectangular circuit substrate; and
   a shield unit placed in the rectangular circuit substrate, the shield unit being configured to block an electromagnetic wave incident on the electronic components, wherein:
   the input-output terminal is placed on a first end side of the rectangular circuit substrate in a longitudinal direction of the rectangular circuit substrate;
   the shield unit includes a plate portion at a position where the plate portion overlaps at least a part of the electronic components when the shield unit is viewed in a thickness direction of the rectangular circuit substrate, the plate portion of the shield unit being on a second side of the rectangular circuit substrate opposite the first side;
   the shield unit includes a window portion provided as a through-hole or a notch penetrating through the plate portion in a thickness direction of the plate portion; and
   the window portion is placed at a position close to the input-output terminal in the longitudinal direction of the rectangular circuit substrate, without overlapping the input-output terminal, when the window portion is viewed in the thickness direction of the rectangular circuit substrate.

2. The sonar unit according to claim 1, wherein:
   the input-output terminal includes a GND terminal connected to ground;
   the rectangular circuit substrate is electrically connected to the GND terminal and has a first through-hole having the same potential as the GND terminal;
   the shield unit includes an attachment terminal to be attached to the rectangular circuit substrate and is electrically connected to the first through-hole and joined to the first through-hole in a state where the attachment terminal is passed through the first through-hole; and the first through-hole is disposed at a position where a distance to the GND terminal is shortest among terminals included in the input-output terminal.

3. The sonar unit according to claim 1, further comprising a housing in which the transducer and the shield unit are accommodated in a state where the transducer and the shield unit are mounted on the rectangular circuit substrate, wherein the rectangular circuit substrate has a communicating passage through which a space on a first surface side of the rectangular circuit substrate communicates with a space on a second surface side of the rectangular circuit substrate.

4. The sonar unit according to claim 1, wherein a distance between the plate portion and the rectangular circuit substrate becomes shorter from the first end side toward a second end side of the rectangular circuit substrate in the longitudinal direction.

5. The sonar unit according to claim 1, wherein:
the rectangular circuit substrate includes second through-holes through which lead terminals of the transducer are passed in an electrically connected manner; and
the transducer and the second through-holes overlap the window portion when the transducer and the second through-holes are viewed in the thickness direction of the rectangular circuit substrate.

\* \* \* \* \*